United States Patent
Rhee

(10) Patent No.: US 10,024,753 B2
(45) Date of Patent: Jul. 17, 2018

(54) SEALING SYSTEM HAVING LEAKAGE SENSING FUNCTION

(71) Applicant: SEALINK CORP., Seoul (KR)

(72) Inventor: Hee Jang Rhee, Gunpo-si (KR)

(73) Assignee: Sealink Corp., Seoul (KR)

( * ) Notice: Subject to any disclaimer, the term of this patent is extended or adjusted under 35 U.S.C. 154(b) by 0 days.

(21) Appl. No.: 15/128,863

(22) PCT Filed: Dec. 26, 2014

(86) PCT No.: PCT/KR2014/012879
§ 371 (c)(1),
(2) Date: Sep. 23, 2016

(87) PCT Pub. No.: WO2015/147422
PCT Pub. Date: Oct. 1, 2015

(65) Prior Publication Data
US 2017/0108399 A1  Apr. 20, 2017

(30) Foreign Application Priority Data

Mar. 27, 2014  (KR) .................. 10-2014-0036056
Dec. 12, 2014  (KR) .................. 10-2014-0179198

(51) Int. Cl.
*F16J 3/00*  (2006.01)
*G01M 3/28*  (2006.01)
(Continued)

(52) U.S. Cl.
CPC ......... *G01M 3/2869* (2013.01); *F16J 15/002* (2013.01); *F16J 15/322* (2013.01); *G01M 3/38* (2013.01)

(58) Field of Classification Search
CPC ..... F16J 15/002; F16J 15/322; G01M 3/2869; G01M 3/38
(Continued)

(56) References Cited

U.S. PATENT DOCUMENTS 2,047,427 A  *  7/1936  Nyquist ................ G01M 3/181
                                                              200/81.6
3,449,025 A     6/1969  Cox
(Continued)

FOREIGN PATENT DOCUMENTS

CN       1791759 A    6/2006
CN     102033070 A    4/2011
(Continued)

OTHER PUBLICATIONS

International Search Report for PCT U.S. Appl. No. PCT/KR2014/012879 dated Mar. 16, 2015.
(Continued)

*Primary Examiner* — Nathan Cumar
(74) *Attorney, Agent, or Firm* — McCormick, Paulding & Huber LLP

(57) ABSTRACT

One embodiment of the present invention relates to a sealing system having a leakage sensing function. A leakage sensing unit is arranged in a sealed space which is formed between sealing members of a sealing device body so as to sense, in real time, whether the sealing members are leaking, wherein a sensing value of the leakage sensing unit can be transmitted to the outside by using a communication unit.

12 Claims, 13 Drawing Sheets

(51) Int. Cl.
*F16J 15/00* (2006.01)
*F16J 15/322* (2016.01)
*G01M 3/38* (2006.01)

(58) Field of Classification Search
USPC .................................. 277/320, 317, 929
See application file for complete search history.

(56) References Cited

U.S. PATENT DOCUMENTS

| | | | | |
|---|---|---|---|---|
| 4,086,497 | A * | 4/1978 | Murray | ............... G01N 21/909 |
| | | | | 250/223 R |
| 4,792,911 | A | 12/1988 | Gonzalez et al. | |
| 4,972,867 | A * | 11/1990 | Ruesch | .................. F16K 37/00 |
| | | | | 137/15.11 |
| 5,823,541 | A | 10/1998 | Dietle et al. | |
| 7,926,593 | B2 * | 4/2011 | Bailey | .................... E21B 21/08 |
| | | | | 166/338 |
| 2001/0030396 | A1 | 10/2001 | Pecht et al. | |
| 2004/0227302 | A1 * | 11/2004 | Burdick | ................ F16J 15/004 |
| | | | | 277/510 |
| 2009/0290971 | A1 | 11/2009 | Shamseldin et al. | |
| 2010/0013167 | A1 | 1/2010 | Bachhofner et al. | |
| 2013/0016357 | A1 * | 1/2013 | Cheim | ................... G01M 3/38 |
| | | | | 356/445 |

FOREIGN PATENT DOCUMENTS

| | | | |
|---|---|---|---|
| JP | 2002071257 A | | 3/2002 |
| JP | 2003316883 A | | 11/2003 |
| JP | 2004 028164 | * | 1/2004 |
| JP | 2004028164 A | | 1/2004 |
| JP | 2007500331 A | | 1/2007 |
| JP | 2007101356 A | | 4/2007 |
| KR | 20010077089 A | | 8/2001 |
| KR | 20060097034 A | | 9/2006 |

OTHER PUBLICATIONS

Supplementary European Search Report for Serial No. EP 14 88 6677 dated Feb. 5, 2018.

* cited by examiner

SEALING SYSTEM HAVING LEAKAGE SENSING FUNCTION

CROSS REFERENCE TO RELATED APPLICATION

This application is entitled to the benefit of and incorporates by reference subject matter disclosed in the International Patent Application No. PCT/KR2014/012879 filed on Dec. 26, 2014, Korean Patent Application No. 10-2014-0036056 filed on Mar. 27, 2014 and Korean Patent Application No. 10-2014-0179198 filed on Dec. 12, 2014.

TECHNICAL FIELD

Embodiments of the present invention relate to a sealing system for sealing a drive shaft that performs a rotary motion or a reciprocating rectilinear motion, and more particularly, to a sealing system having a leakage sensing function to quickly and accurately sense whether sealing members of the sealing system are leaking.

BACKGROUND ART

In general, a mechanism such as a gearbox, a chemical pump, a stirrer, a mixer, a reactor, a transmission, a drier, or a compressor includes a drive shaft, and a rotary sealing device is installed on the drive shaft to prevent a leakage along the drive shaft.

The rotary sealing device includes a lip seal type sealing device, a mechanical seal type sealing device, and a radial shaft seal type sealing device based on types of sealing members.

For example, Korean Registered Patent No. 10-0356502, entitled "A Sealing Devices for Axis of Rotation Material", published on Aug. 17, 2001, discloses a lip seal type rotary sealing device, and Korean Patent Application Publication No. 10-2006-0097034, entitled "Mechanical Seal Apparatus Utilizing Mechanical Seal", published on Sep. 13, 2006, discloses a mechanical seal type rotary sealing device.

Typically, a mechanical seal type rotary sealing device is applicable to an extreme environment and has a great safety and an excellent sealing performance. However, the mechanical seal type rotary sealing device has a complex structure, has difficulties in maintenance, includes a number of components, and requires a great manufacturing cost.

Conversely, a lip seal type rotary sealing device is simply structured, is easily maintained, and requires a low manufacturing cost. However, when compared to the mechanical seal type sealing device, the lip seal type rotary sealing device has a low durability, a low sealing performance, and a low safety, and thus is applicable to a narrower field. Recently, a material and a structure of a lip seal type sealing member have improved, and the lip seal type rotary sealing device is applicable to an increasing number of fields.

In particular, in the field in which a rotary sealing device is used, a leakage accident leads to serious casualties and damage of property. Thus, it is significantly important to quickly and accurately detect whether the rotary sealing device is leaking, and to determine a time to replace the rotary sealing device.

SUMMARY

An aspect of the present invention provides a sealing system having a leakage sensing function that may quickly and accurately sense whether sealing members are leaking.

Another aspect of the present invention provides a sealing system having a leakage sensing function that may prevent a leakage accident in advance by accurately diagnosing a time to replace sealing members.

Still another aspect of the present invention provides a sealing system having a leakage sensing function that may maximize a time of use of sealing members by accurately verifying states of the sealing members.

Yet another aspect of the present invention provides a sealing system having a leakage sensing function that may inform a manager of states of sealing members in real time, thereby allowing the manager to accurately establish an operation plan for the sealing system and to efficiently establish an operation plan for a mechanism including the sealing system and a relevant facility.

Further another aspect of the present invention provides a sealing system having a leakage sensing function that may be conveniently applicable to a lip seal type sealing system, a mechanical seal type sealing system, and a radial shaft seal type sealing system.

According to an aspect of the present invention, there is provided a sealing system having a leakage sensing function, the sealing system including a sealing device body that includes a housing disposed to enclose a drive shaft, a plurality of sealing members spaced apart from each other between the housing and the drive shaft to seal a space between the housing and the drive shaft, and a retaining ring member disposed between the sealing members, and a leakage sensing unit disposed in a sealed space formed between the sealing members to sense whether the sealing members are leaking, wherein a sensing hole may be formed in the housing and the retaining ring member to communicate with the sealed space, and an extension space may be formed on at least one of an inner circumferential surface of the housing or an outer circumferential surface of the retaining ring member to extend from the sensing hole and communicate with the sensing hole.

That is, the sealing system may sense whether the sealing members are leaking in real time using the leakage sensing unit disposed between the sealing members, and allow a fluid to communicate through an extension space although a sensing hole of the housing and a sensing hole of the retaining ring member are not disposed coaxially when assembling the housing and the retaining ring member, thereby improving an assembly convenience.

The sealing members may include at least one of mechanical seals, lip seals, radial shaft seals, o-rings, oil seals, shaft seals, or rubber rings.

The extension space may include a ring-shaped groove formed in a circumferential direction thereof. Further, a ring-shaped packing member may be provided on at least one side of the extension space to be in close contact with the outer circumferential surface of the retaining ring member and the inner circumferential surface of the housing.

Unlike the above, the extension space may include packing members disposed on both sides of the sensing hole between the inner circumferential surface of the housing and the outer circumferential surface of the retaining ring member to form a space.

A plurality of sealed spaces may be formed in a longitudinal direction of the drive shaft. The leakage sensing unit may be disposed in at least one of the sealed spaces.

The leakage sensing unit may be disposed inside or outside of the sensing hole.

The sensing hole may be formed in the housing such that both end portions thereof are disposed to communicate with the sealed space and outside of the housing. The leakage sensing unit may be disposed at a position spaced apart from the sealed space to secure an allowable distance from the sealed space.

Here, the leakage sensing unit may be installed in the sensing hole through a first end portion, which communicates with outside of the housing, of both the end portions of the sensing hole. A shielding member may be provided in the housing to be disposed at the first end portion to shield the sensing hole from the air. The leakage sensing unit and the shielding member may be formed as an integral body such that the leakage sensing unit may be disposed at a portion of the shielding member to be in contact with the sensing hole.

Unlike the above, a plurality of sensing holes may be formed at different portions of the sealed space such that both end portions of each of the sensing holes may be connected to the sealed space and the extension space. In this example, the leakage sensing unit may be disposed between the sensing holes to secure an allowable distance from the sealed space. Here, an installation hole may be provided in the housing such that both end portions thereof are disposed to communicate with the extension space and outside of the housing, and a shielding member may be disposed in the installation hole to shield the sensing hole from the air. The leakage sensing unit may be installed in the extension space through the installation hole.

The leakage sensing unit may include a sensor disposed in the sealed space to sense at least one of a material leaking into the sealed space or an environmental change in the sealed space. The leakage sensing unit may include at least one of a gas sensor, a liquid sensor, a foreign material sensor, a pressure sensor, or a temperature sensor.

According to another aspect of the present invention, there is also provided a sealing system having a leakage sensing function, the sealing system including a sealing device body that includes a housing disposed to enclose a drive shaft, and a plurality of sealing members spaced apart from each other between the housing and the drive shaft to seal a space between the housing and the drive shaft, and a leakage sensing unit disposed in a sealed space formed between the sealing members to sense whether the sealing members are leaking, wherein a plurality of sealed spaces may be formed in a longitudinal direction of the drive shaft, and the leakage sensing unit may include a pressure sensor and a temperature sensor that are disposed in at least two of the sealed spaces, respectively.

That is, the sealing system may sense whether the sealing members are leaking in real time using the leakage sensing unit disposed between the sealing members, and measure the temperature and the pressure in each sealed space, thereby sensing whether the sealing members are leaking more precisely.

A plurality of leakage sensing units may be disposed in a single sealed space.

Unlike the above, the leakage sensing unit may include optical sensors disposed in neighboring sealed spaces formed on both sides of each of the sealing members to sense whether the sealing members are damaged. The leakage sensing unit may include a light emitting sensor disposed in one of the sealed spaces to emit light toward the sealing members, and a light receiving sensor disposed in another of the sealed spaces to sense light passing through the sealing members.

The sealing system may further include a communicator provided in the sealing device body and connected to the leakage sensing unit to transmit a value sensed by the leakage sensing unit to outside of the sealing device body.

Here, the communicator may be configured to perform at least one of wireless communication or wired communication.

The sealing system may further include a terminal provided to a manager who manages the sealing device body, and connected to the communicator for signal transfer to display the value sensed by the leakage sensing unit in real time.

The sealing system may further include a display provided in a management office in which the sealing device body and the drive shaft are managed, and connected to the communicator for signal transfer to display the value sensed by the leakage sensing unit in real time.

The sealing system may further include an alarm provided in a management office in which the sealing device body and the drive shaft are managed, and connected to the communicator for signal transfer to generate an alarming sound when the value sensed by the leakage sensing unit is outside of a set range.

The sealing system may further include a controller connected to the communicator and a drive shaft operator to control an operation of the drive shaft based on the value sensed by the leakage sensing unit, the drive shaft operator configured to operate the drive shaft.

The sealing system may further include a communicator provided in the sealing device body and connected to the leakage sensing unit to transmit a value sensed by the leakage sensing unit to outside of the sealing device body, a controller connected to the communicator to receive the value sensed by the leakage sensing unit, a terminal connected to the controller to display the value sensed by the leakage sensing unit in real time, a display connected to the controller to display the value sensed by the leakage sensing unit in real time, and an alarm connected to the controller to generate an alarming sound when the value sensed by the leakage sensing unit is outside of a set range.

The controller may be connected to the terminal to perform bidirectional communication with the terminal, so as to receive an instruction through the terminal and control an operation of the drive shaft.

The terminal may include at least one of a computer, a mobile phone, a smart phone, a tablet personal computer (PC), an electronic book, a personal digital assistant (PDA), or a portable game console. Software may be installed in the terminal to perform bidirectional communication with the controller and display the value sensed by the leakage sensing unit.

The display and the alarm may be provided in a management office in which operations of the sealing device body and the drive shaft are managed. The controller may be configured to control the operation of the drive shaft in accordance with an instruction from the management office.

According to an embodiment of the present invention, a sealing system may quickly and accurately sense whether sealing members are leaking by disposing a leakage sensing unit in a sealed space formed between the sealing members of a sealing device body. Thus, a leakage accident may be prevented in advance by accurately diagnosing a time to replace the sealing members. Further, states of the sealing members may be accurately verified in real time, and thus a time of use of the sealing members may be maximized, whereby a maintenance cost of the sealing device body may be reduced.

According to an embodiment of the present invention, a sealing system may be provided in a structure in which a leakage sensing unit is dispose in a sensing hole formed in a housing of a sealing device body, and thus the sealing system may be simply applicable to various types of sealing systems without greatly changing a structure of the sealing device body. That is, the embodiment may be conveniently applicable to a lip seal type sealing system, a mechanical seal type sealing system, and a radial shaft seal type sealing system.

According to an embodiment of the present invention, a sealing system may inform a manager of a value sensed by a leakage sensing unit in real time through a terminal, and inform a manager in a management office of the value sensed by the leakage sensing unit in real time through a display and an alarm. Thus, the manager in the management office or the outside manager may check the state of the sealing system in real time, thereby accurately establishing an operation plan for the sealing system and efficiently establishing an operation plan for a mechanism including the sealing system and a relevant facility.

According to an embodiment of the present invention, a sealing system may allow a manager to transmit a predetermined instruction to a controller through a terminal, and thus the manager may suitably control an operation of a drive shaft in real time based on a value sensed by a leakage sensing unit.

According to an embodiment of the present invention, a sealing system may be provided in a structure in which a leakage sensing unit is installed through a sensing hole from outside of a housing of a sealing device body, and thus the leakage sensing unit may be maintained and conveniently replaced with another type of leakage sensing unit without disassembling the sealing device body. Thus, various modifications may be made to the leakage sensing unit based on a target in which the sealing system is to be installed, and accordingly a single sealing device body may be applicable to various fields.

BEST MODE FOR CARRYING OUT THE INVENTION

Figure 1:
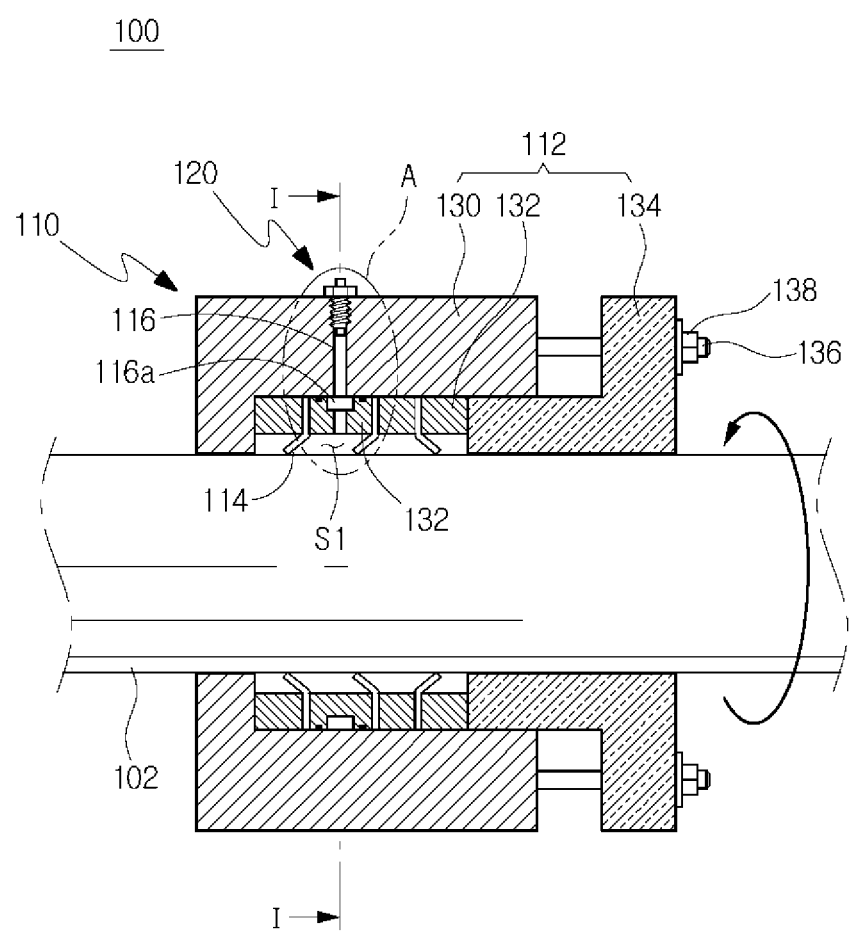
FIG. 1 illustrates a sealing system having a leakage sensing function according to an embodiment.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
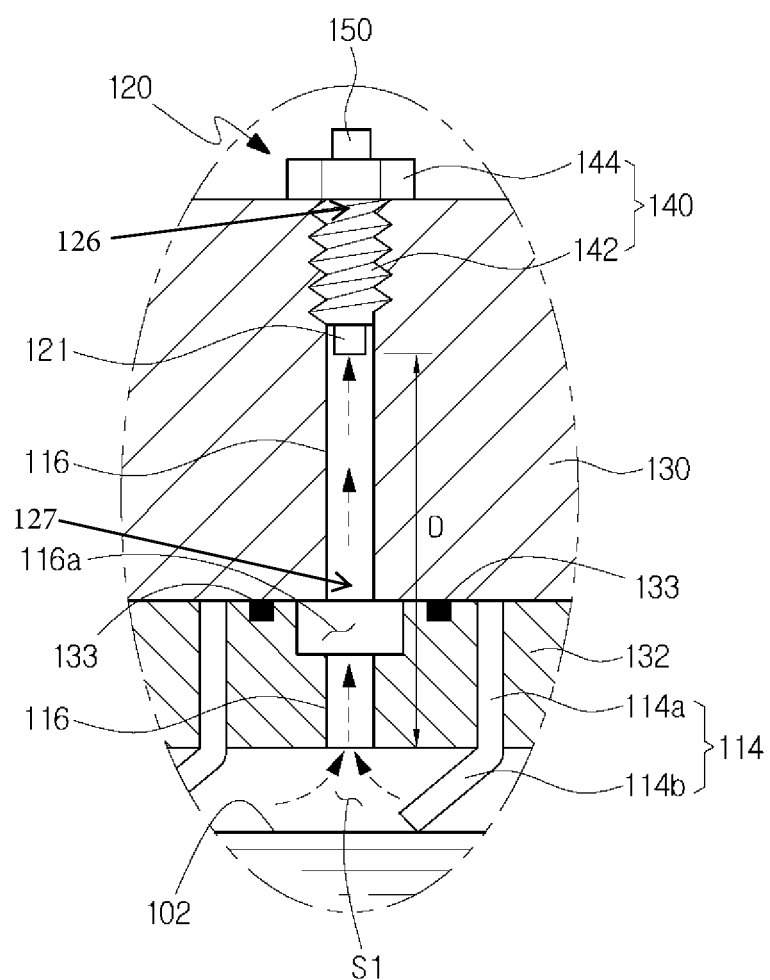
FIG. 2 is an enlarged view of a portion A of FIG. 1.

FIG. 1 illustrates a sealing system 100 having a leakage sensing function according to an embodiment. FIG. 2 is an enlarged view of a portion A of FIG. 1, and FIG. 3 is a cross-sectional front view cut along a line I-I of FIG. 1.

Figure 3:
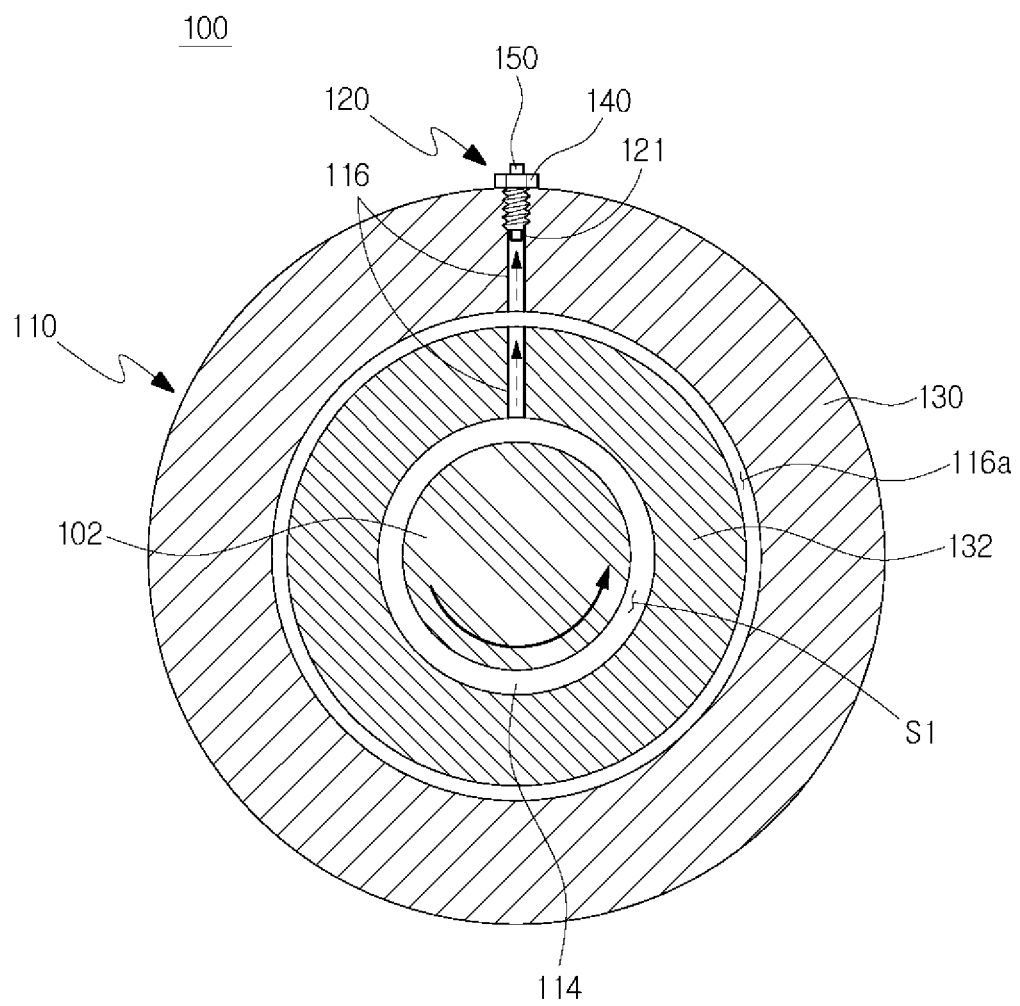
FIG. 3 is a cross-sectional front view cut along a line I-I of FIG. 1.

Referring to FIGS. 1 through 3, the sealing system 100 having a leakage sensing function includes a sealing device body 110 and a leakage sensing unit 120.

In general, mechanisms such as a stirrer, a reactor, and a mixer are widely used in the fields of petrochemistry, fine chemistry, medical science, pharmacy, and food. The mechanisms may each include a drive shaft that performs a rotary motion or a reciprocating rectilinear motion at a predetermined speed, and the sealing system 100 may be sealably provided at a portion of the drive shaft. Meanwhile, although it is described herein that the drive shaft is in a state of performing a rotary motion or a reciprocating rectilinear motion, embodiments are not limited thereto. The state may further include a substantially static state or a state of oscillating or moving toward a radial direction.

The sealing system 100 is a device that seals the drive shaft 102 to perform a rotary motion or a reciprocating rectilinear motion. The sealing system 100 may be disposed on an outer circumference of the drive shaft 102 to enclose a portion of the drive shaft 102, or disposed on an outer circumference of a sleeve to enclose the sleeve that is disposed in a portion of the drive shaft 102. The sleeve may be disposed in a cylindrical form on the outer circumference of the drive shaft 102, and coupled to the drive shaft 102 to rotate along with the drive shaft 102. Hereinafter, for ease of description, the sleeve is omitted in the description. However, embodiments are not limited thereto. The sleeve may be disposed according to the design and conditions of the sealing system.

Referring to FIGS. 1 through 3, the sealing device body 110 is a device that seals a perimeter of the drive shaft 102. The sealing device body 110 may enclose a circumference of the drive shaft 102. For example, the sealing device body 110 may include a housing 112 and a sealing member 114.

The housing 112 may be provided in a hollow cylindrical structure to enclose the outer circumference of the drive shaft 102. Thus, the drive shaft 102 may penetrate through a central portion of the housing 112. For example, the housing 112 may include a first housing body 130, a retaining ring member 132, and a second housing body 134.

Here, the first housing body 130 may be provided in a cylindrical shape to enclose the outer circumference of the drive shaft 102. A through-hole may be formed on one side of the first housing body 130 such that the drive shaft 102 may penetrate through the through-hole to perform a rotary motion or a rectilinear motion. An opening may be formed on another side of the first housing body 130 such that the retaining ring member 132 and the second housing body 134 may be inserted into the first housing body 130 through the opening.

The retaining ring member 132 may be disposed on an inner circumferential surface of the first housing body 130. The retaining ring member 132 is a constituent element that fixes the sealing member 114 to inside of the first housing body 130. That is, a plurality of retaining ring members 132 may be stacked in a longitudinal direction of the drive shaft 102, and the sealing member 114 may be disposed between every two of the retaining ring members 132.

Further, the second housing body 134 may be coupled to the first housing body 130 such that one end portion thereof may be inserted into the opening of the first housing body 130. The one end portion of the second housing body 134 may be in contact with the retaining ring member 132 inside of the first housing body 130. Meanwhile, the second housing body 134 and the first housing body 130 may be fastened to each other through fastening members 136 and 138. By adjusting a fastening force of the fastening members 136 and 138, a pressure at which the one end portion of the second housing body 134 is forcibly in contact with the retaining ring members 132 may increase. That is, the retaining ring members 132 and the sealing member 114 may be firmly and stably fixed between the first housing body 130 and the second housing body 134 by the fastening force of the fastening members 136 and 138.

The sealing member 114 is a sealing element that seals a space between the housing 112 and the drive shaft 102. The sealing member 114 may include a mechanical seal, a lip seal, a radial shaft seal, an o-ring, an oil seal, a shaft seal, or a rubber ring. A plurality of sealing members 114 may be disposed to be spaced apart from each other between the housing 112 and the drive shaft 102 in an axial direction of the drive shaft 102. Hereinafter, for ease of description, it is described that the sealing member 114 is a lip seal.

That is, the sealing member 114 may be manufactured as a lip seal that is provided in a form of a disk with a hole in the middle thereof. The sealing member 114 may include a fixing portion 114a and a lip seal portion 114b.

Here, the fixing portion 114a may be disposed between the retaining ring members 132. Thus, the fixing portion 114a may be fixed to inside of the housing 112 while fitting in between the retaining ring members 132. The fixing portion 114a may be provided in a shape of a ring corresponding to the retaining ring members 132.

The lip seal portion 114b may extend slantly from an inner circumferential portion of the fixing portion 114a toward a surface of the drive shaft 102. That is, an inner circumferential end portion of the lip seal portion 114b may be in contact with the surface of the drive shaft 102, and an outer circumferential end portion of the lip seal portion 114b may be connected to the fixing portion 114a. Thus, the lip seal portion 114b may be provided in a form of a disk ring. The lip seal portion 114b may include a rubber material or a plastic material. For example, the lip seal portion 114b may include a polytetrafluoroethylene (PTFE) material, for example, Teflon, that is excellent in terms of heat resistance, non-adhesion, insulation stability, low coefficient of friction, and chemical stability.

Meanwhile, a sealed space S1 may be formed between the sealing members 114. The sealed space S1 refers to a space that is defined by the outer circumferential surface of the drive shaft 102, sides of two neighboring sealing members 114, and the inner circumferential surface of the retaining ring member 132. Similar to the sealing members 114, a plurality of sealed spaces S1 may also be provided in the axial direction of the drive shaft 102.

Referring to FIGS. 1 through 3, the leakage sensing unit 120 is a device configured to sense whether the sealing member 114 is leaking. The leakage sensing unit 120 may be disposed in the sealed space S1. That is, the leakage sensing unit 120 may be disposed between the sealing members 114.

As described above, a plurality of sealed spaces S1 may be disposed to be spaced apart from each other in the longitudinal direction of the drive shaft 102. Here, the leakage sensing unit 120 may be disposed in at least one of the sealed spaces S1. Hereinafter, it is described that the leakage sensing unit 120 is disposed in one of the sealed spaces S1.

Meanwhile, a sensing hole 116 may be provided in the housing 112 to communicate with the sealed space S1. The leakage sensing unit 120 may be installed inside or outside of the sensing hole 116. That is, the leakage sensing unit 120 may be installed inside of the sensing hole 116, or installed in a component extending from the sensing hole 116 toward outside thereof. For example, the component extending from the sensing hole 116 toward outside thereof may include a pipe or tube with one end portion connected to the housing 112 to communicate with the sensing hole 116. Hereinafter, for ease of description, it is described that the leakage sensing unit 120 is disposed inside of the sensing hole 116.

The sensing hole 116 may be provided to penetrate through the first housing body 130. Thus, a first end portion 126 of the sensing hole 116 may be connected to communicate with outside of the housing 112, and a second end portion 127 of the sensing hole 116 may be connected to communicate with the sealed space S1.

In particular, an extension space 116a may be provided in a ring-shaped groove on the outer circumferential surface of the retaining ring member 132 at a position corresponding to the sensing hole 116. The extension space 116a may be formed along an edge of the retaining ring member 132 to communicate with the sensing hole 116. Further, the extension space 116a may preferably extend to have a width greater than a diameter of the sensing hole 116. Thus, although the sensing hole 116 formed in the first housing body 130 and the sensing hole 116 formed in the retaining ring member 132 are not disposed coaxially when assembling the first housing body 130 and the retaining ring member 132, a fluid may communicate therebetween, whereby an assembly convenience may improve.

Further, ring-shaped packing members 133, for example, o-ring-shaped packing members 133, may be provided on both sides of the extension space 116a formed in the retaining ring member 132 to be in close contact with the outer circumferential surface of the retaining ring member 132 and the inner circumferential surface of the first housing body 130, thereby preventing an inflow of an external fluid into the extension space 116a or an outflow of an internal fluid through an assembly surface of the retaining ring member 132 and the first housing body 130.

Meanwhile, it is described that the groove-shaped extension space 116a is formed on the outer circumferential surface of the retaining ring member 132. However, the extension space 116a may be configured by forming a groove on the inner circumferential surface of the first housing body 130 at a position corresponding to the sensing hole 116, or by forming grooves on the outer circumferential surface of the retaining ring member 132 and the inner circumferential surface of the first housing body 130.

The leakage sensing unit 120 may be disposed at a suitable position of the sensing hole 116 based on the sealed space S1. That is, the leakage sensing unit 120 may be disposed at a position suitably spaced apart from the sealed space S1 according to the design and conditions of the sealing system. Thus, the leakage sensing unit 120 may secure a suitable allowable distance D from the sealed space S1.

In detail, a sensitivity may be expected to improve as a distance between the leakage sensing unit 120 and the sealed space S1 decreases. However, a risk of damage or malfunction may also increase due to bad effects from the sealed space S1. For example, the temperature and the pressure of the sealed space S1 may suddenly change according to the operating conditions or circumstances of the sealing system 100. In this example, as the distance between the leakage sensing unit 120 and the sealed space S1 decreases, a probability of the leakage sensing unit 120 being damaged due to the sudden change in the temperature and the pressure may increase. A material that causes degradation in the performance of the leakage sensing unit 120 may be generated in the sealed space S1 or flow into the sealed space S1 according to the operating conditions or circumstances of the sealing system 100. In this example, as the distance between the leakage sensing unit 120 and the sealed space S1 decreases, a probability of the material being in contact with the leakage sensing unit 120 may increase.

When a sufficient allowable distance D between the leakage sensing unit 120 and the sealed space S1 is secured, an impact from the sudden change in the temperature and the pressure in the sealed space S1 may be alleviated, and a probability of the material that decreases the performance of the leakage sensing unit 120 moving to the leakage sensing unit 120 may be reduced.

As shown in FIGS. 1 through 3, the leakage sensing unit 120 may be installed inside of the sensing hole 116 through the first end portion of the sensing hole 116. Thus, the leakage sensing unit 120 may be easily installed or replaced without disassembling the sealing device body 110.

Meanwhile, the first end portion of the sensing hole 116 may be preferably blocked from outside of the housing 112 to protect the sealing state of the sealed space S1 from the sensing hole 116. That is, a shielding member 140 may be disposed at the first end portion of the sensing hole 116. If the shielding member 140 does not block the first end portion of the sensing hole 116, an external foreign material may flow into the sealed space S1 through the sensing hole 116. Thus, when the leakage sensing unit 120 is installed inside of the sensing hole 116 through the first end portion of the sensing hole 116, the shielding member 140 may be disposed at the first end portion of the sensing hole 116 to secure the sealing state of the sealed space S1.

Unlike the above description, the leakage sensing unit 120 and the shielding member 140 may be provided as an integral body. That is, the shielding member 140 and the leakage sensing unit 120 may be formed as a single component such that when the shielding member 140 is disposed, the leakage sensing unit 120 may also be installed. Here, the leakage sensing unit 120 may be disposed at a portion to be in contact with the sensing hole 116 when disposing the shielding member 140. Hereinafter, it is described that the leakage sensing unit 120 and the shielding member 140 are formed as an integral body. However, embodiments are not limited thereto. Various modifications may be made thereto according to the design and conditions of the sealing system.

For example, the shielding member 140 may be provided in a structure of a stopper bolt. That is, the shielding member 140 may include a fastener 142 and a tightener 144. Here, one end portion of the fastener 142 may be inserted into the first end portion of the sensing hole 116. The one end portion of the fastener 142 and the first end portion of the sensing hole 116 may be sealably coupled to each other in a screw fastening manner. The tightener 144 may be connected to another end portion of the fastener 142 and disposed outside of the housing 112. That is, by manipulating the tightener 144, the fastener 142 may be rotated conveniently. For example, the tightener 144 may be provided in a form of a hexagonal head that may be gripped by a wrench for a screw fastening operation of the fastener 142.

The leakage sensing unit 120 may be disposed at the one end portion of the fastener 142. In this example, the distance D between the leakage sensing unit 120 and the sealed space S1 may also be adjusted based on a length of the fastener 142. Further, the shielding member 140 may further include a sealing body. The sealing body may be disposed between the fastener 142 and the housing 112, or disposed between the tightener 144 and the housing 112. An o-ring or a gasket may be used as the sealing body. However, it is described herein that the sealing body is omitted from the shielding member 140.

Figure 4:
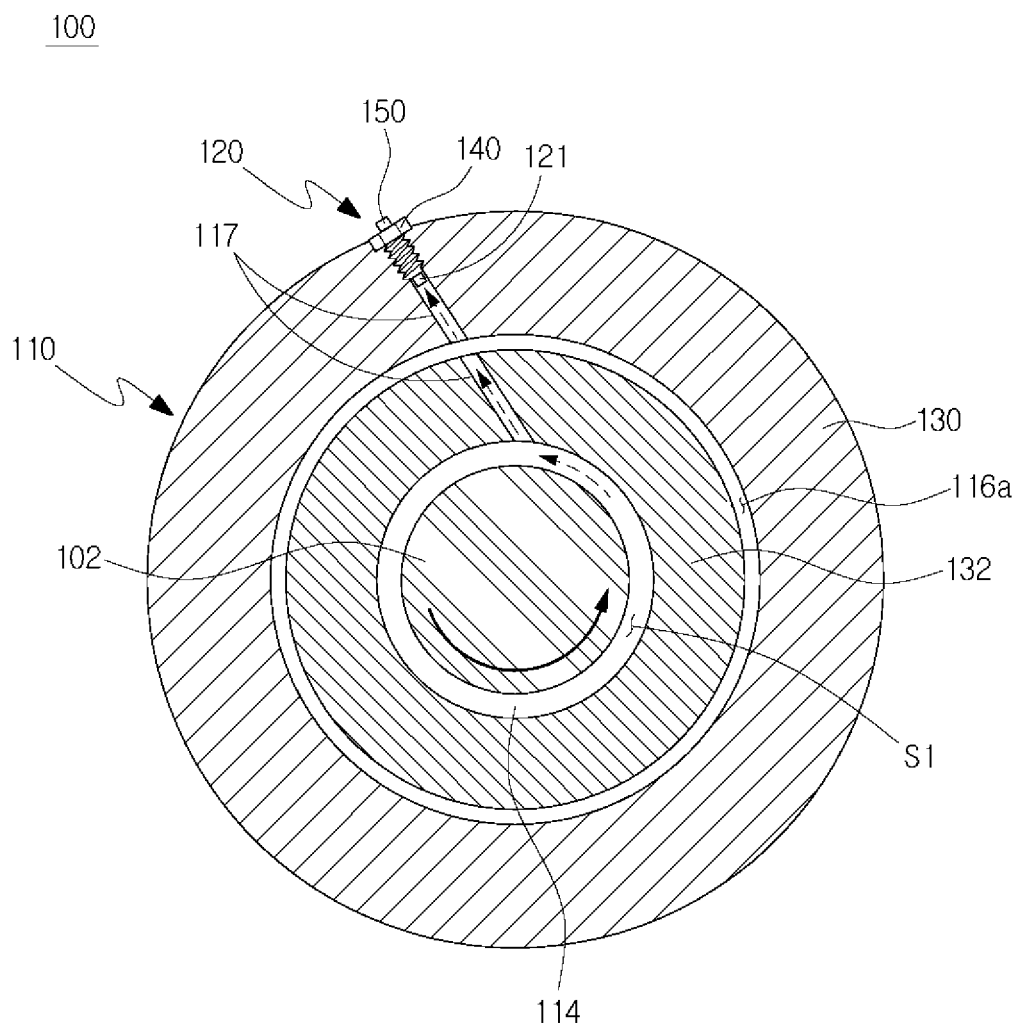
FIGS. 4 through 6 are cross-sectional front views illustrating various installation structures of a leakage sensing unit of FIG. 1.
Figure 5:
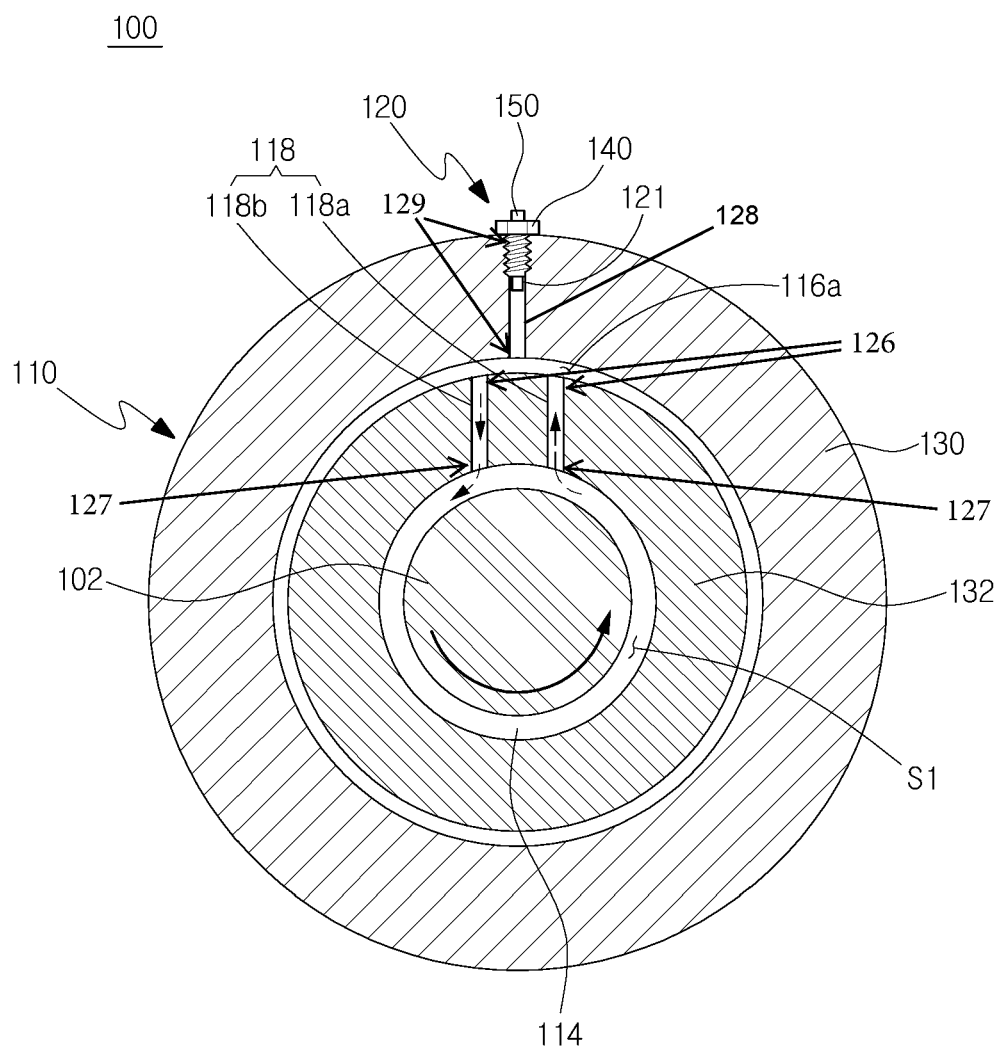
Figure 6:
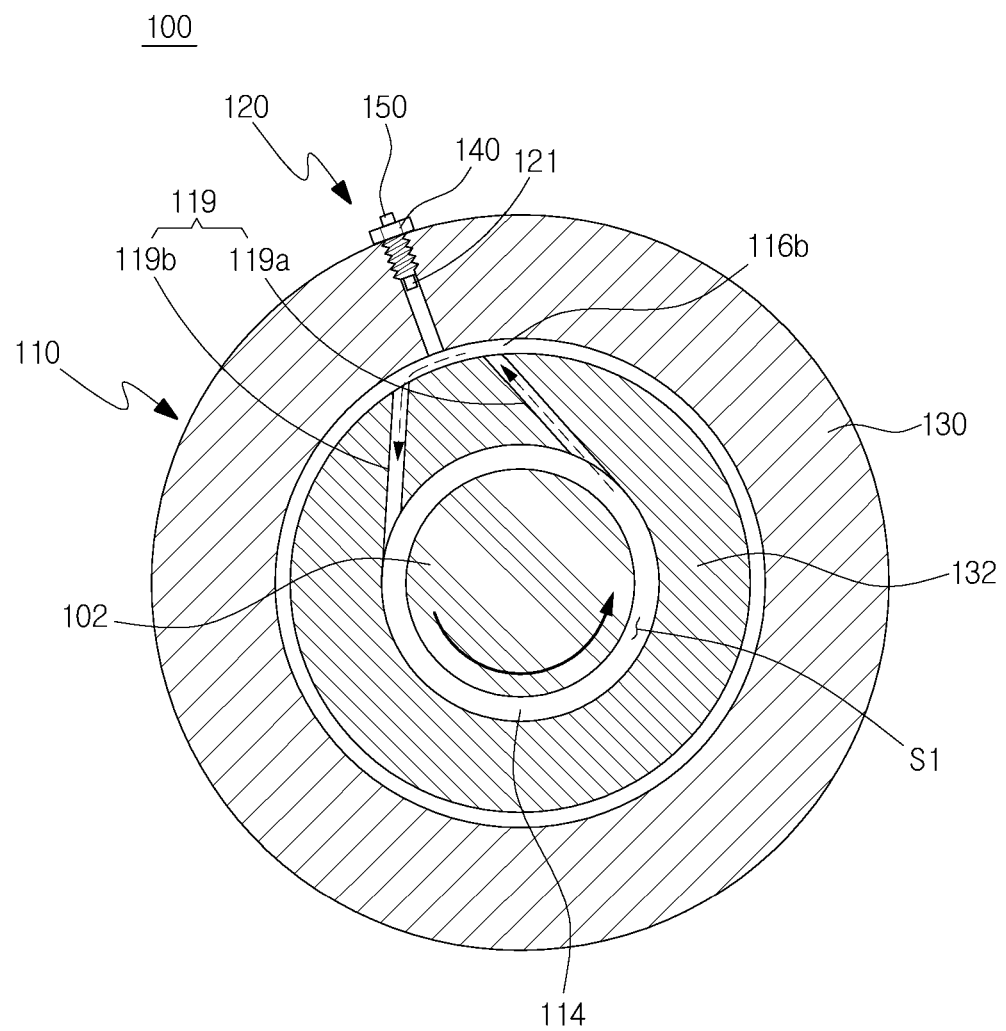

FIGS. 4 through 6 are cross-sectional front views illustrating various installation structures of the leakage sensing unit 120 of FIG. 1.

In detail, FIGS. 4 through 6 illustrate various modifications made to the installation structure of the leakage sensing unit 120 based on various shapes of sensing holes 117, 118 and 119.

Referring to FIG. 4, the sensing hole 117 may be formed in a slant structure unlike the sensing hole 116 of FIGS. 1 through 3. In detail, the sensing hole 116 of FIGS. 1 through 3 is formed lengthwise in a radial direction from the center of the drive shaft 102, whereas the sensing hole 117 of FIG. 4 is formed to intersect, at a predetermined angle, a virtual straight line provided lengthwise in a radial direction from the center of the drive shaft 102.

The sensing hole 117 may slant in a rotation direction of the drive shaft 102. Thus, when the drive shaft 102 rotates, gas, liquid, or a foreign material that moves in the rotation direction along with the drive shaft 102 may smoothly flow into inside of the sensing hole 117.

Here, the extension space 116a may be formed on the outer circumferential surface of the retaining ring member 132 at a position corresponding to the sensing hole 116 to extend to be greater than the diameter of the sensing hole 116 and communicate with the sensing hole 116. When the extension space 116a is formed as described above, a fluid may communicate between the sensing hole 116 formed in the first housing body 130 and the sensing hole 116 formed in the retaining ring member 132 although the sensing holes 116 are not disposed coaxially in an area in which the extension space 116a is formed, whereby an assembly convenience of the first housing body 130 and the retaining ring member 132 may improve.

Referring to FIG. 5, a plurality of sensing holes 118 may be provided at different positions of the sealed space S1, unlike the sensing hole 116 of FIGS. 1 through 3. One end portion 127 of each of the plurality of sensing holes 118 may be connected to one side of the sealed space S1, and another end portion 126 of each of the plurality of sensing holes 118 may be connected to the extension space 116a formed on the outer circumferential surface of the retaining ring member 132 such that the plurality of sensing holes 118 may be connected to communicate through the extension space 116a. That is, the sensing holes 118 may be provided in the retaining ring member 132 not to be connected to communicate with an external space of the housing 112.

For example, the plurality of sensing holes 118 may include a first sensing hole 118a and a second sensing hole 118b that are parallel with each other in the retaining ring member 132.

When the sensing holes 118 are formed as described above, a flow that moves along inside of the sensing holes 118 may occur, and thus the temperature, liquid, a foreign material, or gas in the sealed space S1 may be effectively transferred to inside of the sensing holes 118.

Meanwhile, the leakage sensing unit 120 may be suitably disposed between both end portions 126 of each of the sensing holes 118 to secure the sufficient allowable distance D from the sealed space S1. For example, an installation hole 128 may be provided in the housing 112 such that both end portions 129 thereof may communicate with outside of the housing 112 and the extension space 116a. The shielding member 140 may be inserted into the installation hole 128 and the leakage sensing unit 120 may be disposed inside of the sensing holes 118 through the installation hole 128 along with the shielding member 140.

Referring to FIG. 6, a plurality of sensing holes 119 may be provided at different positions of the sealed space S1, unlike the sensing hole 116 of FIGS. 1 through 3. However, the sensing holes 119 may be configured by slanting the first sensing hole 118a and the second sensing hole 118b, unlike the sensing holes 118 of FIG. 5.

For example, the sensing holes 119 may include a first sensing hole 119a and a second sensing hole 119b in the retaining ring member 132. The first sensing hole 119a and the second sensing hole 119b of FIG. 6 may be formed similarly to the first sensing hole 118a and the second sensing hole 118b of FIG. 5. However, the first sensing hole 119a and the second sensing hole 119b of FIG. 6 differ from the first sensing hole 118a and the second sensing hole 118b of FIG. 5 in that the first sensing hole 119a and the second sensing hole 119b are formed to slant in the rotation direction of the drive shaft 102. That is, the first sensing hole 119a and the second sensing hole 119b may be formed not to be parallel with each other.

In detail, the first sensing hole 119a may be formed in a direction parallel with a normal from a point in contact with the outer circumferential surface of the sealed space toward a front side with respect to the rotation direction of the drive shaft 102, and the second sensing hole 119b may be formed in a direction parallel with a normal toward a rear side with respect to the rotation direction of the drive shaft 102, at a position spaced apart from the first sensing hole 119a toward the front side with respect to the rotation direction of the drive shaft 102.

Thus, when the drive shaft 102 rotates, gas, liquid, or a foreign material that moves in the rotation direction of the drive shaft 102 may smoothly flow into inside of the first sensing hole 119a, and smoothly discharge into the sealed space S1 through the second sensing hole 119b.

The leakage sensing unit 120 may be suitably disposed between both end portions of each of the sensing holes 119 to secure the sufficient allowable distance D from the sealed space S1.

An installation hole may be provided in the housing 112 such that both end portions thereof may communicate with outside of the housing 112 and the groove 116a of the retaining ring member 132. The shielding member 140 may be inserted into the installation hole.

As described above, the sensing holes 119 may be provided in various structures according to the design and conditions of the sealing system. The installation structure of the leakage sensing unit 120 may vary based on the sensing holes 119. For example, the sensing holes 119 may be formed to slant in a direction in which the drive shaft 102 performs a reciprocating rectilinear motion, or formed in a structure in which both end portions of each of the sensing holes 119 are connected to communicate with different portions of the sealed space S1 in the direction in which the drive shaft 102 performs a reciprocating rectilinear motion.

Figure 7:
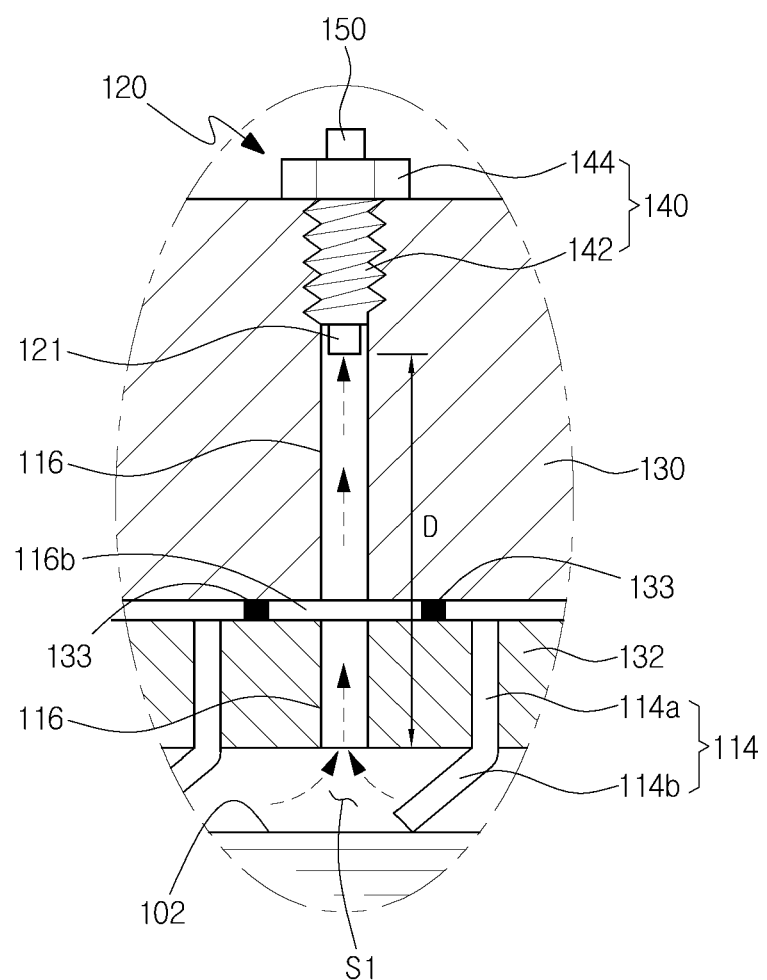
FIG. 7 illustrates a modified example of a sealing system having a leakage sensing function according to an embodiment.

FIG. 7 illustrates a modified example of a sealing system having a leakage sensing function according to an embodiment. That is, FIG. 7 illustrates a modified example of the sealing system 100 of FIGS. 1 through 4.

Referring to FIG. 7, an extension space 116b of the sealing system may be defined by the inner circumferential surface of the first housing body 130, the outer circumferential surface of the retaining ring member 132, and the ring-shaped packing members 133 disposed on both sides of the sensing hole 116 to be in close contact with the first housing body 130 and the retaining ring member 132.

Although the extension space 116a of FIGS. 1 through 3 is provided in a form of a ring-shaped groove, the extension space 116b of FIG. 7 may be formed by the ring-shaped packing members 133 disposed on both sides from the sensing hole 116.

When the extension space 116b is formed by the ring-shaped packing members 133 as described above, a ring-shaped groove as shown in FIGS. 1 through 3 may not need to be processed separately between the first housing body 130 and the retaining ring member 132, and leakage through a coupling surface between the first housing body 130 and the retaining ring member 132 may be prevented.

Figure 8:
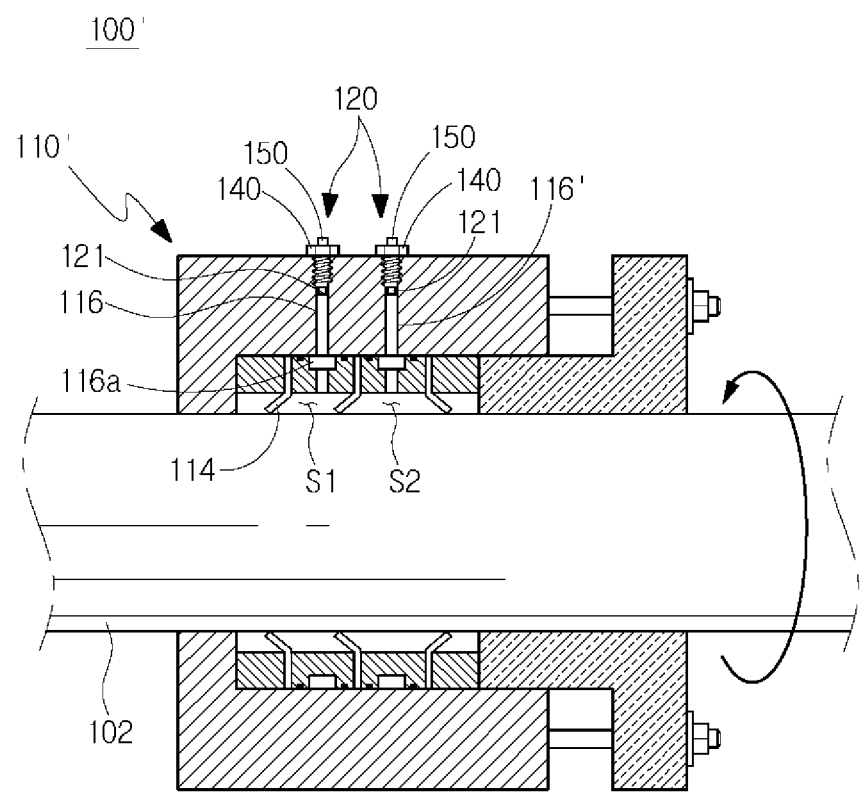
FIGS. 8 and 9 illustrate examples of sealing systems having a leakage sensing function according to an embodiment.
Figure 9:
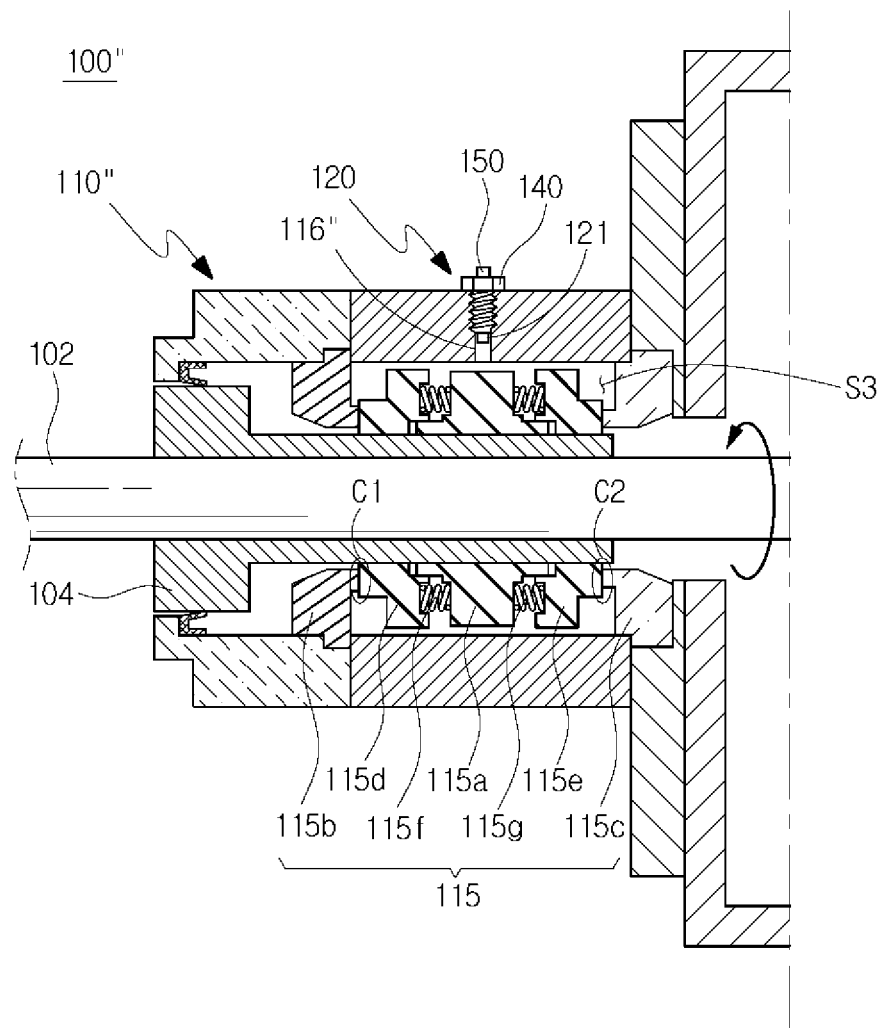

FIGS. 8 and 9 illustrate examples of sealing systems 100' and 100" having a leakage sensing function according to an embodiment.

That is, FIGS. 8 and 9 illustrate different modified examples of the sealing system 100 of FIGS. 1 through 3.

Referring to FIG. 8, the sealing system 100' is characterized in that the sensing holes 116 and 116' are formed in all sealed spaces S1 and S2, respectively. That is, although FIGS. 1 through 6 illustrate a structure in which the sensing hole 116 is formed in one S1 of the sealed spaces, FIG. 8 illustrates a structure in which the sensing holes 116 and 116' are formed in the sealed spaces S1 and S2 separately. Meanwhile, the leakage sensing unit 120 and the shielding member 140 may be provided in each of the sensing holes 116 and 116'.

Thus, the leakage sensing units 120 may simultaneously sense leakage with respect to all the sealed spaces S1 and S2. That is, the leakage sensing units 120 may simultaneously diagnose states of all the sealing members 114 provided in a sealing device body 110', thereby quickly and accurately detecting whether each sealing member 114 is leaking.

In detail, the leakage sensing unit 120 disposed in each of the sealed spaces S1 and S2 may include a pressure sensor and a temperature sensor. By simultaneously measuring the temperature and the pressure of the corresponding sealed space S1 or S2, whether the sealing member 114 is leaking or abnormal may be sensed. That is, a contact area of the lip seal portion 114b of the sealing member 114 and the drive shaft 102 may change based on a pressure applied to a front portion of the sealing member 114. As the contact area increases, the temperature of the adjacent sealed space S1 or S2 may increase by frictional heat. Thus, by measuring the temperature of the sealed space S1 or S2 adjacent to the sealing member 114, whether the sealing member 114 is abnormal may be sensed before the pressure of the sealed space S1 or S2 changes due to damage to the sealing member 114.

Further, by configuring a plurality of leakage sensing units 120 to be disposed in each of the sealed spaces S1 and S2 in case a sensor is incapable of sensing due to malfunction or damage, a sensing reliability may improve. That is, when one of the plurality of sensors is damaged or malfunctions, another sensor installed in the corresponding sealed space S1 or S2 may provide a measured signal value, whereby the performance of safety of the sealing system 100' may improve.

Referring to FIG. 9, the sealing system 100" is characterized in that a mechanical seal type sealing member 115 is provided. That is, the sealing member may include at least one of a lip seal, a mechanical seal, or a radial shaft seal. The sealing member 114 of FIGS. 1 through 6 is formed as a lip seal, and the sealing member 115 of FIG. 9 is formed as a mechanical seal.

As shown in FIG. 9, a sleeve 104 may be disposed on the outer circumference of the drive shaft 102 and rotate along with the drive shaft 102, and a sealing device body 110" may be disposed on an outer circumference of the sleeve 104 to enclose the sleeve 104.

The mechanical seal type sealing member 115 may include a center supporting ring 115a fixed to the sleeve 104, a first retaining ring 115b and a second retaining ring 115c fixed to the housing 112 at spaced positions on both side of the center supporting ring 115a, a first sealing ring 115d disposed in the sleeve 104 to move between the first retaining ring 115b and the center supporting ring 115a, a second sealing ring 115e disposed in the sleeve 104 to move between the second retaining ring 115c and the center supporting ring 115a, a first elastic body 115f disposed between the first sealing ring 115d and the center supporting ring 115a such that the first sealing ring 115d and the first retaining ring 115b may be in close contact with each other, and a second elastic body 115g disposed between the second sealing ring 115e and the center supporting ring 115a such that the second sealing ring 115e and the second retaining ring 115c may be in close contact with each other.

Here, the first sealing ring 115d and the second sealing ring 115e may sealably overlap the center supporting ring 115a and move in an axial direction along the sleeve 104. A first sealing contact portion C1 to be compressed by an elastic force of the first elastic body 115f may be formed in the first sealing ring 115d and the first retaining ring 115b, and a second sealing contact portion C2 to be compressed by an elastic force of the second elastic body 115g may be formed in the second sealing ring 115e and the second retaining ring 115c.

Thus, the sealed space S1 is defined by outer circumferential surfaces of the center supporting ring 115a, the first sealing ring 115d, and the second sealing ring 115e, the inner circumferential surface of the housing 112, and sides of the first retaining ring 115b and the second retaining ring 115c.

A sensing hole 116" may be provided in the housing 112 such that the leakage sensing unit 120 and the shielding member 140 may be disposed therein, and both end portions of the sensing hole 116" may be connected to communicate with a sealed space S3 and outside of the housing 112. Meanwhile, the leakage sensing unit 120 and the shielding member 140 are the same as the configuration of FIGS. 1 through 6, and thus duplicated descriptions will be omitted herein for conciseness.

The leakage sensing structure as described above may simply apply to both the lip seal type sealing system 100 or 100' and the mechanical seal type sealing system 100".

Figure 10:
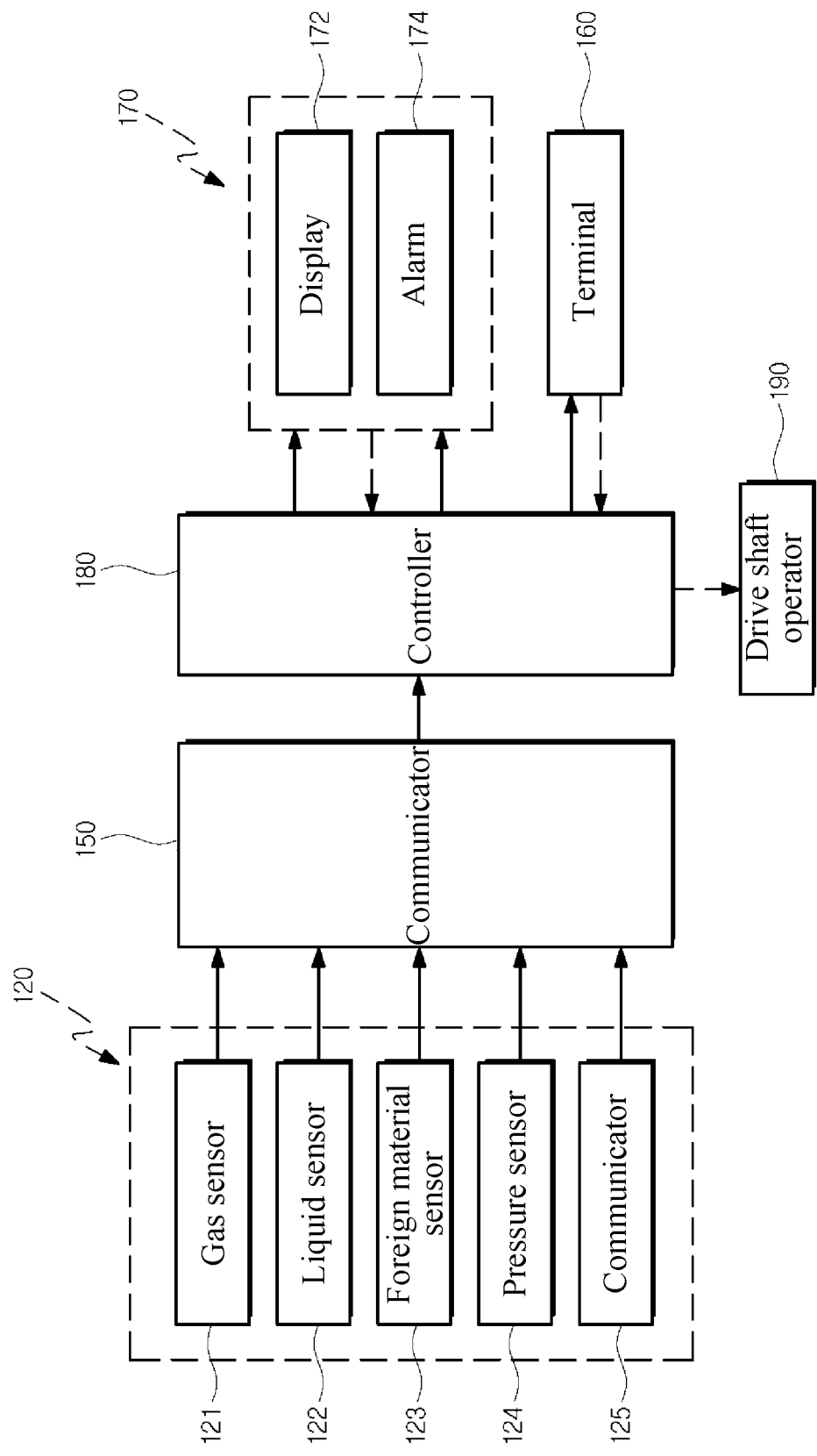
FIG. 10 illustrates a control configuration of a leakage sensing system according to an embodiment.

FIG. 10 illustrates a control configuration of a leakage sensing system according to an embodiment.

Referring to FIGS. 1, 2, and 10, the leakage sensing unit 120 may include sensors 121, 122. 123, 124, and 125 disposed in the sealed space S1 to sense at least one of a material leaking into the sealed space S1 or an environmental change in the sealed space S1.

The material leaking into the sealed space S1 may include at least one of gas, liquid, or a foreign material, and the environmental change in the sealed space S1 may include at least one of a change in temperature or a change in pressure.

For example, the leakage sensing unit 120 may include at least one of the gas sensor 121, the liquid sensor 122, the foreign material sensor 123, the pressure sensor 124, or the temperature sensor 125.

The gas sensor 121 is a sensor configured to sense gas leaking into the sealed space S1, the liquid sensor 122 is a sensor configured to sense liquid leaking into the sealed space S1, and the foreign material sensor 123 is a sensor configured to sense a foreign material entering the sealed space S1. Further, the pressure sensor 124 is a sensor configured to sense a change in pressure in the sealed space S1, and the temperature sensor 125 is a sensor configured to sense a change in temperature in the sealed space S1.

Meanwhile, for ease of description, it is described that the leakage sensing unit 120 is formed as the gas sensor 121 in the sealing system 100 having a leakage sensing function in FIGS. 1 through 9. However, as shown in FIG. 10, the leakage sensing unit 120 may be configured using one of the gas sensor 121, the liquid sensor 122, the foreign material sensor 123, the pressure sensor 124, or the temperature sensor 125, or using a combination of at least two thereof. The configuration of the leakage sensing unit 120 may vary according to the design and conditions of the sealing system.

Referring to FIGS. 1 and 10, the sealing system 100 having a leakage sensing function may further include a communicator 150. The communicator 150 is a device that transmits a value sensed by the leakage sensing unit 120 to outside of the sealing device body 110. Here, the communicator 150 may transfer a signal using at least one of wireless communication or wired communication.

The communicator 150 may be provided in the sealing device body 110 to be connected to the leakage sensing unit 120 for signal transfer. In FIGS. 1 through 9, it is described that the communicator 150 is provided in the tightener 144 of the shielding member 140. That is, similar to the leakage sensing unit 120, the communicator 150 and the shielding member 140 may be formed as a single module. Here, the communicator 150 and the leakage sensing unit 120 may be connected to each other for signal transfer in the shielding member 140. When the shielding member 140, the leakage sensing unit 120, and the communicator 150 are formed as a single module, the leakage sensing unit 120 and the communicator 150 may be installed together by attaching or detaching the shielding member 140, and the leakage sensing unit 120 and the communicator 150 may be easily maintained and managed.

However, embodiments are not limited thereto. The displacement may vary according to the design and conditions of the sealing system. For example, the communicator 150 may be disposed on an outer side of the housing 112, or disposed at a position a predetermined distance spaced apart from the sealing device body 110. In this example, a task of connecting the communicator 150 and the leakage sensing unit 120 for signal transfer may be difficult and complex.

Referring to FIGS. 1 and 10, the sealing system 100 having a leakage sensing function may further include a terminal 160.

The terminal 160 may be provided in a portable shape to be individually distributed to a manager of the sealing device body 110. For example, the terminal 160 may include at least one of a computer, a mobile phone, a smart phone, a tablet personal computer (PC), an electronic book, a personal digital assistant (PDA), or a portable game console. The terminal 160 may include a display configured to display a value sensed by the leakage sensing unit 120, a manipulator configured to receive an instruction from the manager, and a communicator configured to receive the value sensed by the leakage sensing unit 120 or transmit the instruction of the manager. Thus, the manager of the sealing device body 110 may confirm the value sensed by the leakage sensing unit 120 in real time, and respond quickly based on the value sensed by the leakage sensing unit 120.

Referring to FIGS. 1 and 10, the sealing system 100 having a leakage sensing function may further include a display 172 and an alarm 174.

The display 172 or the alarm 174 may be provided in a management office 170 in which the sealing system 100 and a mechanism are managed. The management office 170 is a control tower in which managers work, for example, manage operating states of the sealing system 100 and the mechanism in real time, and handle accidents and decrease in productivity by quickly responding to errors or malfunction. In general, the management office 170 is positioned near the place in which the mechanics are installed. However, embodiments are not limited thereto. The management office 170 may be installed at various places according to circumstances.

The display 172 may display the value sensed by the leakage sensing unit 120 in real time, and the alarm 174 may generate an alarming sound when the value sensed by the leakage sensing unit 120 is outside of a set range. The display 172 may include a display device including a monitor or a lamp. The alarm 174 may generate the alarming sound when the value sensed by the leakage sensing unit 120 is within a risky range, and perform an alarm function based on a preset condition. Thus, the display 172 or the alarm 174 may include a communication device configured to receive the value sensed by the leakage sensing unit 120.

Referring to FIGS. 1 and 10, the sealing system 100 having a leakage sensing function may further include a controller 180.

The controller 180 may be connected to the communicator 150 and a drive shaft operator 190 for signal transfer to control an operation of the drive shaft 102 based on the value sensed by the leakage sensing unit 120. Here, the drive shaft operator 190 is a member that operates the drive shaft 102 to perform a rotary motion or a reciprocating rectilinear motion in the axial direction. In detail, the controller 180 may be connected to the communicator 150 for signal transfer to receive the value sensed by the leakage sensing unit 120. Further, the controller 180 may be connected to the drive shaft operator 190 for signal transfer to suitably control the operation of the drive shaft 102 based on the value sensed by the leakage sensing unit 120.

Hereinafter, for ease of description, it is described that the mechanism is a rotary machine including a drive shaft that performs a rotary motion, and thus the drive shaft operator 190 rotates the drive shaft 102. However, embodiments are not limited thereto. The embodiments may also applied to a mechanism including a drive shaft that perform a reciprocating rectilinear motion, or a mechanism including a drive shaft that performs both the rotary motion and the reciprocating rectilinear motion.

Meanwhile, the controller 180 may have several operating modes.

In a first operating mode, the controller 180 may receive the value sensed by the leakage sensing unit 120 and transfer the received value sensed by the leakage sensing unit 120 to the terminal 160 and at least one of the display 172 or the alarm 174. Dissimilarly, the value sensed by the leakage sensing unit 120 may be transferred directly to the terminal 160 and the display 172 or the alarm 174 through the communicator 150. However, it is described that the communicator 150 transmits the value sensed by the leakage sensing unit 120 to the controller 180, and the controller 180 suitably distributes the value sensed by the leakage sensing unit 120 to the terminal 160 and the display 172 or the alarm 174.

In the first operating mode, the controller 180 may convert the value sensed by the leakage sensing unit 120 into a suitable type of signal based on a target to which the value sensed by the leakage sensing unit 120 is to be transmitted.

That is, the controller 180 may convert the value sensed by the leakage sensing unit 120 into a type of signal to be processed by the display 172, the alarm 174, or the terminal 160. Further, the controller 180 may transfer the signal directly to the display 172, the alarm 174, or the terminal 160, or transfer the signal using a national communication network based on a distance from the display 172, the alarm 174, or the terminal 160 and whether the display 172, the alarm 174, or the terminal 160 moves.

For example, the display 172 or the alarm 174 is a stationary target positioned at a relatively close distance from the controller 180. Thus, the controller 180 may transmit the value sensed by the leakage sensing unit 120 directly to the display 172 or the alarm 174, which is excellent in terms of security.

Conversely, the terminal 160 is a mobile target positioned at a relatively great distance from the controller 180. Thus, the controller 180 may transmit the value sensed by the leakage sensing unit 120 to the terminal 160 through the national communication network, which is advantageous in that although the manager is not in a field, the manager may check the situation of the field in real time if a national communication network is available.

In a second operating mode, the controller 180 may receive an instruction from the management office 170 or the terminal 160 and control the operation of the drive shaft operator 190. In the second operating mode, the controller 180 may analyze the signal transferred from the management office 170 or the terminal 160, change an operating algorithm of the drive shaft 102, and transmit the operating algorithm to the drive shaft operator 190.

That is, the controller 180 may control the operation of the drive shaft 102 based on an intention of the manager transferred through the management office 170 or the terminal 160. Thus, the controller 180 may be connected to the management office 170 or the terminal 160 to perform bidirectional communication.

Meanwhile, software may be installed in the terminal 160 to perform bidirectional communication with the controller 180 and display the value sensed by the leakage sensing unit 120. That is, without the need of manufacturing the terminal 160 separately, an existing smart phone or an existing tablet PC may be used as the terminal 160 by installing leakage sensing software in the smart phone or the tablet PC. Thus, a cost for manufacturing the terminal 160 separately may be reduced, and the terminal 160 may be used in various environments by simply modifying the software. For example, the software may include an embedded program to be installed in the terminal 160, an installation program for computer, or an application program for a smart phone or a tablet PC.

The operation and the effect of the sealing system 100 having a leakage sensing function are as follows. Hereinafter, the descriptions will be provided based on the examples of FIGS. 1 through 3, and 9.

First, in a situation in which the shielding member 140 including the leakage sensing unit 120 and the communicator 150 is installed in the sensing hole 116, the sealing device body 110 may be disposed on the drive shaft 102 of the rotary machine, and the rotary machine may be operated.

The drive shaft 102 of the rotary machine may rotate at a set speed, and the gas sensor 121 of the leakage sensing unit 120 may detect the sealed space S1 formed between the sealing members 114.

The communicator 150 may transmit the value sensed by the leakage sensing unit 120 to the controller 180 in real time. The controller 180 may suitably change the value sensed by the leakage sensing unit 120, and distribute the value sensed by the leakage sensing unit 120 to the management office 170 and the terminal 160.

The display 172 in the management office 170 may display a signal received through the controller 180, and the alarm 174 in the management office 170 may analyze the signal received through the controller 180 and generate an alarming sound when the value sensed by the leakage sensing unit 120 is outside of the set range. Further, the terminal 160 may display the value sensed by the leakage sensing unit 120 in real time through a predetermined application.

A manager in the management office 170 may confirm whether the sealing system 100 is leaking through the display 172 and the alarm 174. When the leakage of the sealing system 100 is confirmed, the manager may transmit an instruction related to the operation of the rotary machine to the controller 180. Further, a manager outside of the management office 170 may confirm whether the sealing system 100 is leaking through the terminal 160. When the leakage of the sealing system 100 is confirmed, the outside manager may transmit an instruction related to the operation of the rotary machine to the controller 180.

In accordance with the instruction from the manager, the controller 180 may suitably change an operating algorithm of the drive shaft 102, and control the operation of the drive shaft operator 190 using the operating algorithm.

For example, when the leakage of the sealing system 100 is determined to be serious, the controller 180 may stop the operation of the drive shaft operator 190. When a leakage of the sealing system 100 is suspected, the controller 180 may control the operation of the drive shaft operator 190 by reducing a rotation speed of the drive shaft 102.

In this example, by sensing whether the sealing system 100 is leaking in real time, a time to replace the sealing member 114 may be determined accurately. Thus, the sealing system 100 may be used for a longer time when compared to a case of replacing the sealing system 100 at predetermined periods.

Figure 11:
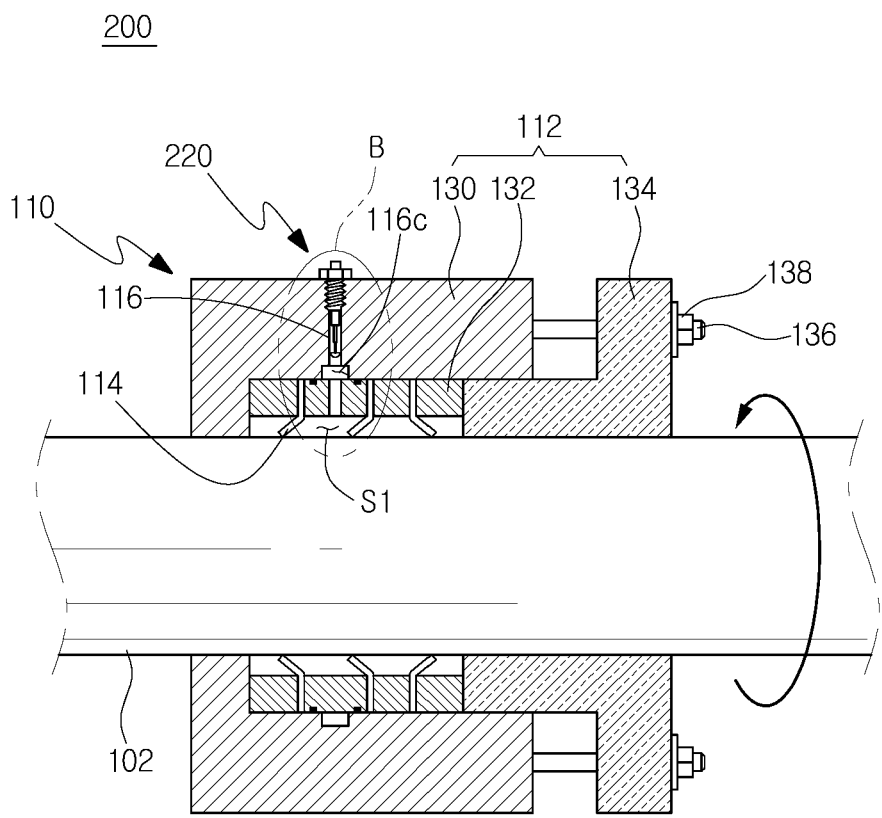
FIG. 11 illustrates a sealing system having a leakage sensing function according to an embodiment.
Figure 12:
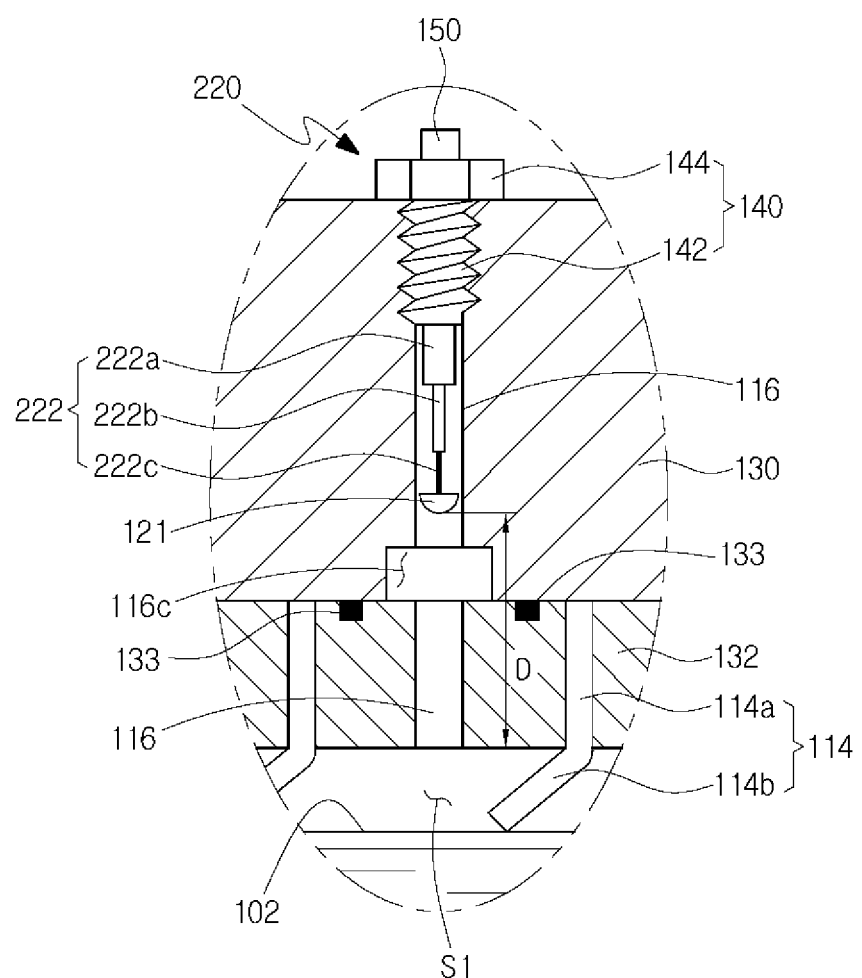
FIG. 12 is an enlarged view of a portion B of FIG. 11.

FIG. 11 illustrates a sealing system 200 having a leakage sensing function according to an embodiment, and FIG. 12 is an enlarged view of a portion B of FIG. 11.

In FIGS. 11 and 12, reference numerals which are the same as or similar to the reference numerals shown in FIGS. 1 through 3 refer to the same elements. Hereinafter, differences between the sealing system 200 of FIGS. 11 and 12 and the sealing system 100 of FIGS. 1 through 3 will be described.

Referring to FIGS. 11 and 12, the sealing system 200 having a leakage sensing function differs from the sealing system 100 of FIGS. 1 through 3 in that an allowable distance D between a leakage sensing unit 220 and a sealed space S1 is adjustable at freedom, and a groove-shaped extension space 116c formed between a first housing body 130 and a retaining ring member 132 is provided on an inner circumferential surface of the first housing body 130.

The leakage sensing unit 220 may include a sensor 121 and a length adjuster 222.

Here, it is described that the sensor 121 corresponds to the gas sensor 121 configured to sense leaking gas, similar to the sealing system 100 of FIGS. 1 through 3. However, embodiments are not limited thereto. The sensor 121 may be another type of sensor configured to sense a leakage of the sealing system 200.

The length adjuster 222 may be provided between a shielding member 140 and the sensor 121 to be length-adjustable. Thus, the length adjuster 222 may suitably adjust the allowable distance D of the sensor 121 according to the design and conditions of the sealing system 200, thereby more accurately maintaining a sensitivity of the sensor 121. In particular, the length adjuster 222 may be used for various types of sealing systems 200 without replacing components, and thus component sharing with respect to the shielding member 140 and the leakage sensing unit 220 may be implemented.

One end portion of the length adjuster 222 may be connected to the shielding member 140, and another end portion of the length adjuster 222 may be connected to the sensor 121. Thus, the sensor 121 may be connected to the communicator 150 for signal transfer through the length adjuster 222 and the shielding member 140 as media.

The length adjuster 222 may be formed in various length-adjustable structures. For example, the length adjuster 222 may be formed in a screw fastening structure, a gear engagement structure, or a folding structure.

Here, the screw fastening structure of the length adjuster 222 is a structure in which a male thread and a female thread are formed in one end portion of the length adjuster 222 and one end portion of the shielding member 140 at corresponding positions. Thus, when the one end portion of the length adjuster 222 or the one end portion of the shielding member 140 is rotated, the one end portion of the length adjuster 222 may be inserted into the shielding member 140 or separated from the shielding member 140, whereby the length may be adjusted.

Further, the gear engagement structure of the length adjuster 222 is a structure in which the length adjuster 222 is formed using a worm gear or a rack and a pinion gear. That is, the worm gear or the rack may be disposed at one end portion of the length adjuster 222, and a worm wheel or the pinion gear may be disposed in one portion of the shielding member 140.

Meanwhile, it is described herein that the length adjuster 222 is formed in the folding structure to be length-adjustable. The sensor 121 may be provided at one end portion of the length adjuster 222. The shielding member 140 may be connected to another end portion of the length adjuster 222.

The length adjuster 222 may be provided in a form in which a plurality of cylinders 222a, 222b, and 222c are inserted into each other and overlap each other. That is, the length adjuster 222 may be formed in a structure similar to an FM receiving antenna. Further, a length adjusting rod (not shown) may be provided in the length adjuster 222. By pushing or pulling the length adjusting rod, the length of the length adjuster 222 may be adjusted.

In particular, the ring-shaped groove 116c may be provided on the inner circumferential surface of the first housing body 130 along an edge of the retaining ring member 132 at a position corresponding to the sensing hole 116 to communicate with the sensing hole 116. Further, the groove 116c may preferably extend in a longitudinal direction of a drive shaft to have a width greater than a diameter of the sensing hole 116. Thus, although the sensing hole 116 formed in the first housing body 130 and the sensing hole 116 formed in the retaining ring member 132 are not disposed coaxially when assembling the first housing body 130 and the retaining ring member 132, a fluid may communicate therebetween, whereby an assembly convenience may improve.

Figure 13:
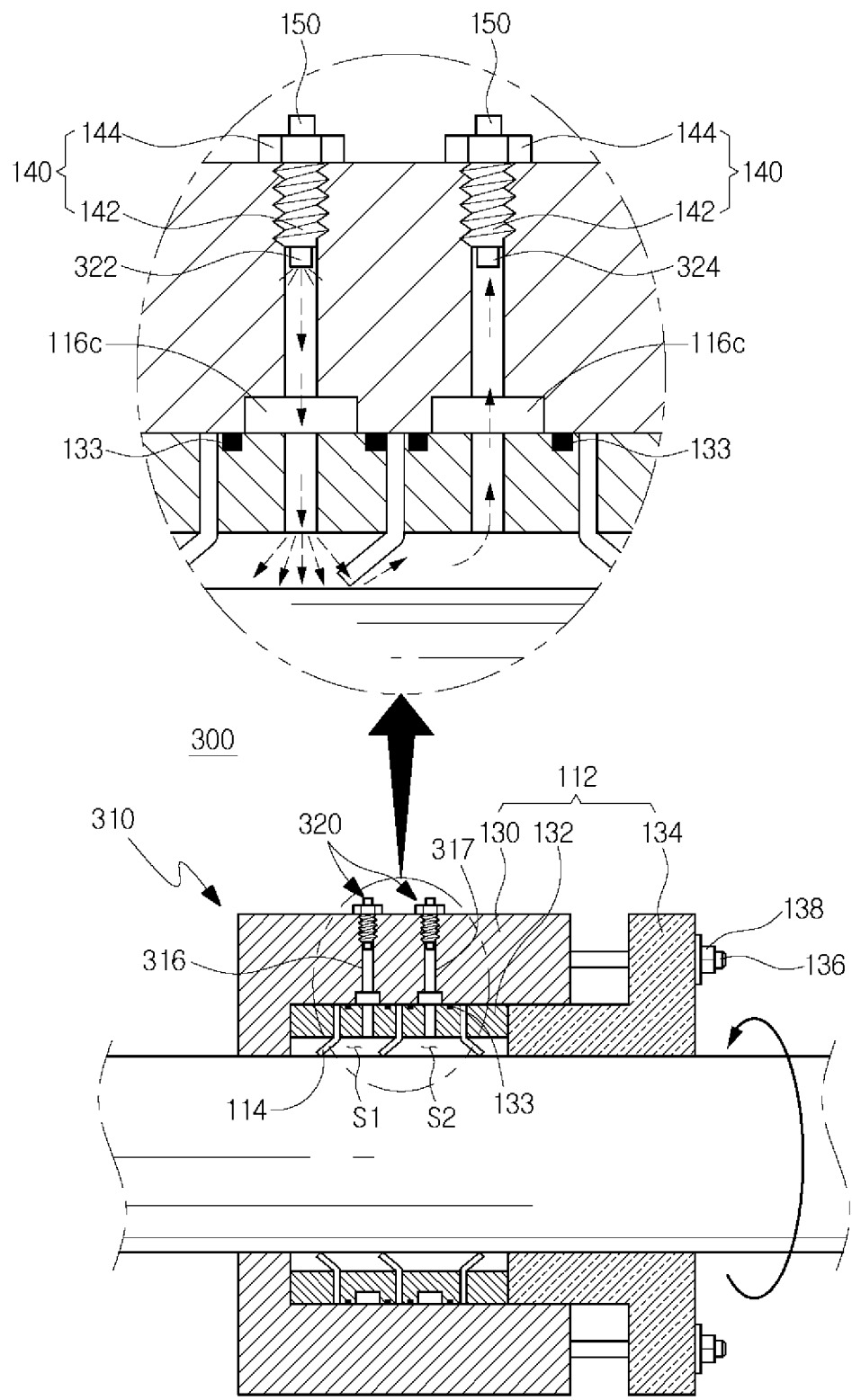
FIG. 13 illustrates a sealing system having a leakage sensing function according to an embodiment.

FIG. 13 illustrates a sealing system 300 having a leakage sensing function according to an embodiment.

In FIG. 13, reference numerals which are the same as or similar to the reference numerals shown in FIGS. 1 through 3 refer to the same elements. Hereinafter, differences between the sealing system 300 of FIG. 13 and the sealing system 100 of FIGS. 1 through 3 will be described.

Referring to FIG. 13, the sealing system 300 having a leakage sensing function differs from the sealing system 100 of FIGS. 1 through 3 in that leakage sensing units 320 are disposed in neighboring sealed spaces S1 and S2 formed on both sides of a sealing member 114.

The leakage sensing units 320 may include optical sensors 322 and 324 disposed in the neighboring sealed spaces S1 and S2. Thus, unlike the leakage sensing unit 120 of FIGS. 1 through 3, the leakage sensing units 320 may be disposed on both sides from the sealing member 114.

The leakage sensing units 320 may include a light emitting sensor 322 and a light receiving sensor 324. The light emitting sensor 322 may be disposed in one S1 of the sealed spaces S1 and S2 formed on both side of the sealing member 114, and the light receiving sensor 322 may be disposed in the other S2 of the sealed spaces S1 and S2 formed on both sides of the sealing member 114. The light emitting sensor 322 may radiate light toward the sealing member 114, and the light receiving sensor 322 may sense light passing through the sealing member 114. When the light receiving sensor 322 senses light from the light emitting sensor 322, it may be inferred that a portion of the sealing member 114 is damaged and cracked, which may indicate that a probability of the sealing member 114 leaking is relatively high.

Meanwhile, two sensing holes 316 and 317 may be formed in a sealing device body 310 to be connected to the different sealed spaces S1 and S2, respectively. A shielding member 140 including the light emitting sensor 322 may be coupled to one sensing hole 316 of the two sensing holes 316 and 317, and a shielding member 140 including the light receiving sensor 322 may be coupled to the other sensing hole 317 of the two sensing holes 316 and 317.

Meanwhile, in the embodiments described above, it is described that the sealed space S1 is formed between a pair of sealing members 114 formed as lip seals. However, according to an installation environment or a user demand, a mechanical seal or a magnetic seal may be additionally disposed between the pair of sealing members 114, or another type of sealing members may substitute the lip seals.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

Embodiments of the present invention relate to a sealing system for sealing a drive shaft that performs a rotary motion or a reciprocating rectilinear motion, and more particularly, to a sealing system having a leakage sensing function to quickly and accurately sense whether sealing members of the sealing system are leaking.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A sealing system having a leakage sensing function, the sealing system comprising:
a sealing device body that includes a housing disposed to enclose a drive shaft, a plurality of sealing members spaced apart from each other between the housing and the drive shaft to seal a space between the housing and the drive shaft, and a retaining ring member disposed between the sealing members; and
a leakage sensing unit disposed in a sealed space formed between the sealing members to sense whether the sealing members are leaking,
wherein a sensing hole is formed in the housing and the retaining ring member to communicate with the sealed space,
an extension space is formed on at least one of an inner circumferential surface of the housing or an outer circumferential surface of the retaining ring member to extend from the sensing hole and communicate with the sensing hole, and
a shielding member is provided in the housing to shield the sensing hole from air,
wherein the leakage sensing unit includes a sensor and a length adjuster,
wherein the length adjuster is provided between the shielding member and the sensor to be length-adjustable and is configured to be adjustable an allowable distance between the sensor and the sealed space,
wherein the shielding member includes a fastener inserted into the sensing hole and a tightener connected to an end portion of the fastener and disposed outside the housing, and
wherein the length adjuster is provided in a form in which a plurality of cylinders are inserted into each other and overlap each other, the fastener is connected to one of the plurality of cylinders, the sensor is connected to the other one of the plurality of cylinders, and the allowable distance between the sensor and the sealed space is adjusted based on a length of the plurality of cylinders.

2. The sealing system of claim 1, wherein the sealing members include at least one of mechanical seals, lip seals, radial shaft seals, o-rings, oil seals, shaft seals, or rubber rings.

3. The sealing system of claim 1, wherein the extension space includes a ring-shaped groove formed in a circumferential direction thereof.

4. The sealing system of claim 1, wherein a ring-shaped packing member is provided on at least one side of the extension space to be in close contact with the outer circumferential surface of the retaining ring member and the inner circumferential surface of the housing.

5. The sealing system of claim 1, wherein the extension space includes packing members disposed on both sides of the sensing hole between the inner circumferential surface of the housing and the outer circumferential surface of the retaining ring member to form a space.

6. The sealing system of claim 1, wherein the leakage sensing unit is disposed inside or outside of the sensing hole.

7. The sealing system of claim 6 wherein the sensing hole is formed in the housing such that both the end portions thereof of the sensing hole are disposed to communicate with the sealed space and outside of the housing, respectively, and the leakage sensing unit is disposed at a position spaced apart from the sealed space to secure the allowable distance from the sealed space.

8. The sealing system of claim 7, wherein the leakage sensing unit is installed in the sensing hole through a first end portion of the end portions of the sensing hole, which communicates the first end portion communicating with outside of the housing, of both the end portions of the sensing hole, and the shielding member is provided in the housing to be disposed at the first end portion to shield the sensing hole from the air.

9. The sealing system of claim 8, wherein the leakage sensing unit and the shielding member are formed as an integral body such that the leakage sensing unit is disposed at a portion of the shielding member to be in contact with the sensing hole.

10. The sealing system of claim 6, wherein a plurality of sensing holes are formed at different portions of the sealed space such that both the end portions of each of the sensing holes are connected to the sealed space and the extension space, respectively, and the leakage sensing unit is disposed between the sensing holes to secure the allowable distance from the sealed space.

11. The sealing system of claim 10, wherein an installation hole is provided in the housing such that both the end portions thereof of the installation hole are disposed to communicate with the extension space and outside of the housing, respectively, the shielding member is disposed in the installation hole to shield the sensing hole from the air, and the leakage sensing unit is installed in the extension space through the installation hole.

12. A sealing system having a leakage sensing function, the sealing system comprising:

a sealing device body that includes a housing disposed to enclose a drive shaft, and a plurality of sealing members spaced apart from each other between the housing and the drive shaft to seal a space between the housing and the drive shaft; and a leakage sensing unit disposed in a sealed space formed between the sealing members to sense whether the sealing members are leaking, wherein a plurality of sealed spaces are formed in a longitudinal direction of the drive shaft, wherein the leakage sensing unit includes a pressure sensor and a temperature sensor that are disposed in at least two of the sealed spaces, respectively, wherein the leakage sensing unit includes optical sensors disposed in neighboring sealed spaces formed on both sides of each of the sealing members to sense whether the sealing members are damaged, wherein the leakage sensing unit includes:

a light emitting sensor disposed in one of the sealed spaces to emit light toward the sealing members; and a light receiving sensor disposed in another of the sealed spaces to sense light passing through the sealing members, wherein, when a portion of the sealing members is damaged, light radiated from the light emitting sensor toward the sealing member passes through a crack between the sealed space and the sealing member, and is sensed in the light receiving sensor, wherein the housing is provided with sensing holes configured to communicate with the sealed spaces and shielding members coupled to the sensing holes to shield the sensing holes from air, and wherein the light emitting sensor and the light receiving sensor are attached to ends of the shielding members, one of the shielding members including the light emitting sensor is coupled to one of the sensing holes, and the other one of the shielding members including the light receiving sensor is coupled to the other one of the sensing holes.

* * * * *